Aug. 30, 1966
G. R. MOORE
3,269,125
HILLSIDE STABILIZING CONSTRUCTION
Filed Nov. 21, 1963
3 Sheets-Sheet 1
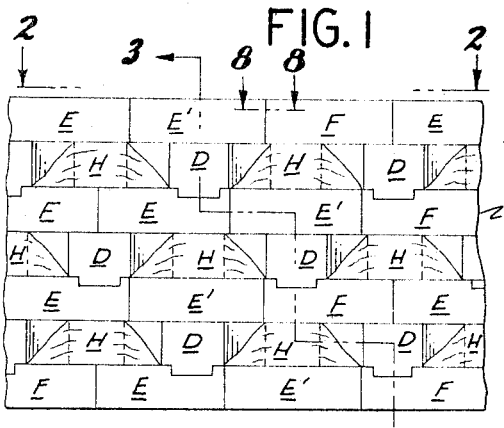
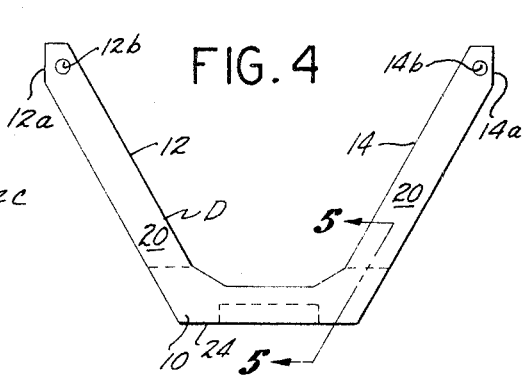
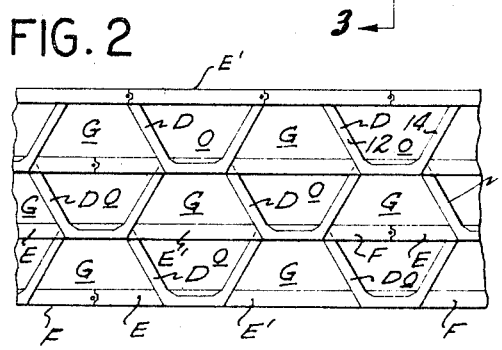
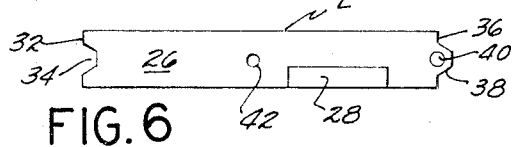
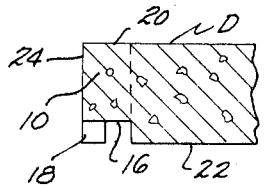
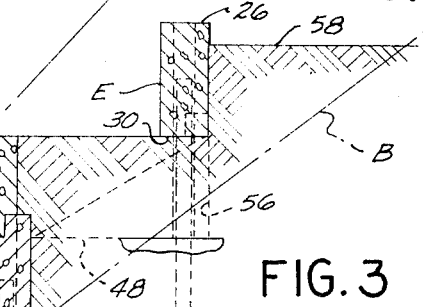
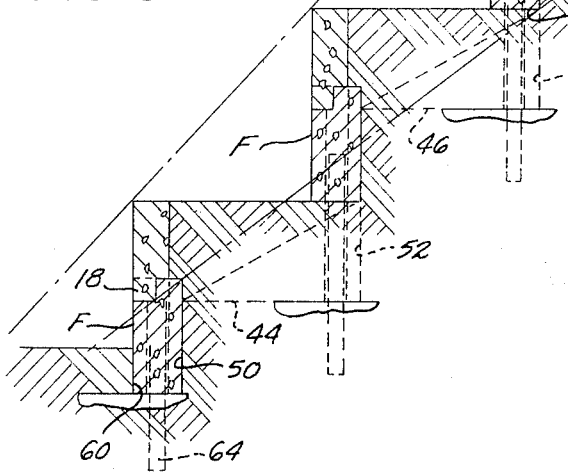
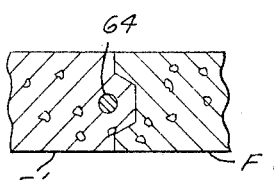
INVENTOR.
GEORGE R. MOORE
BY
William C. Babcock
ATTORNEY

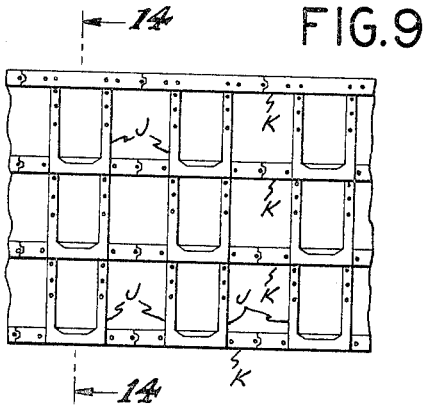
FIG.9
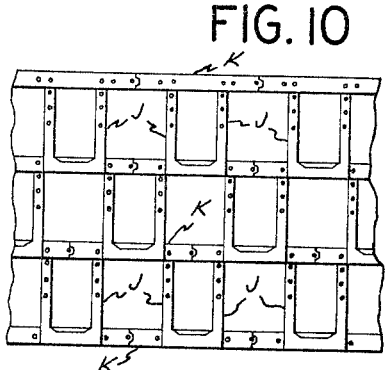
FIG.10
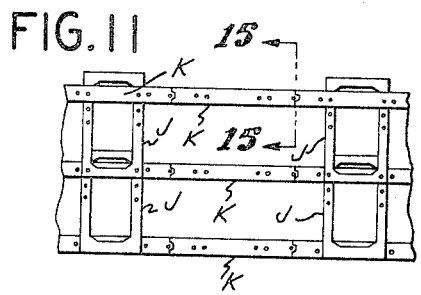
FIG.11
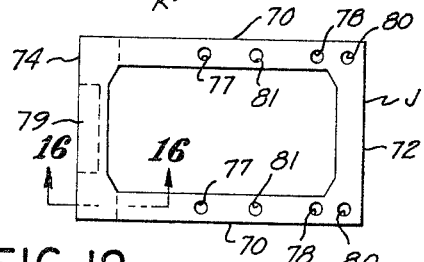
FIG.12
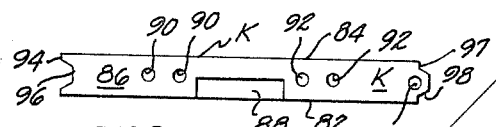
FIG.13
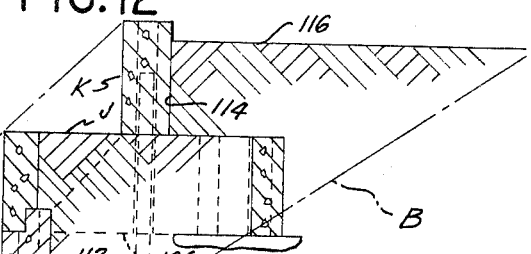
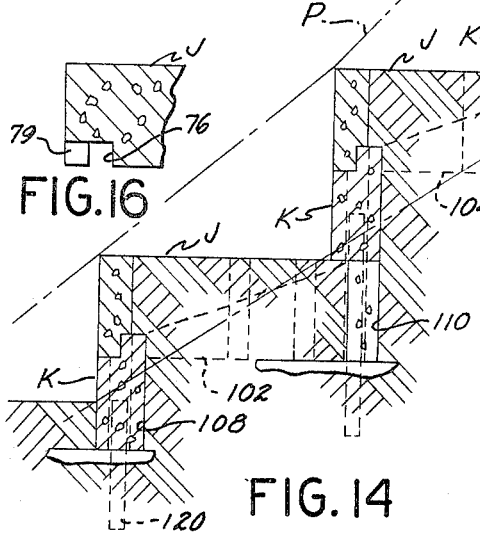
FIG.16
FIG.14
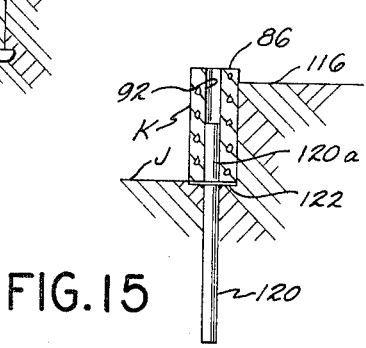
FIG.15
INVENTOR.
GEORGE R. MOORE
BY
William C. Babcock
ATTORNEY

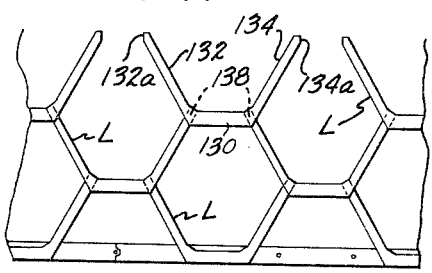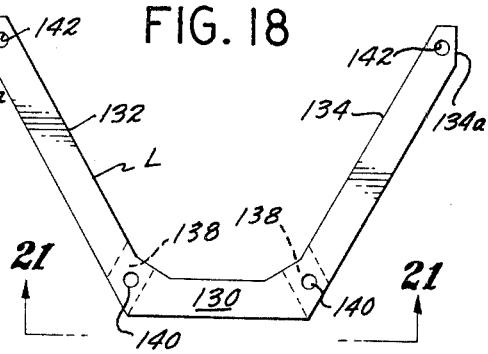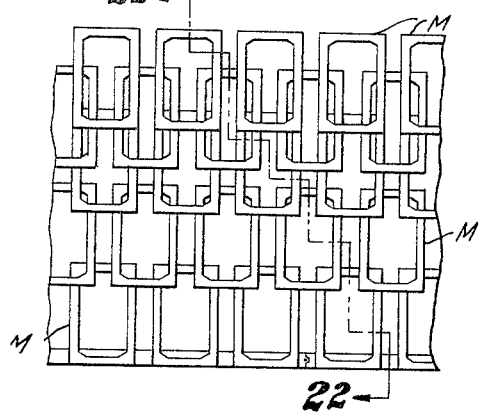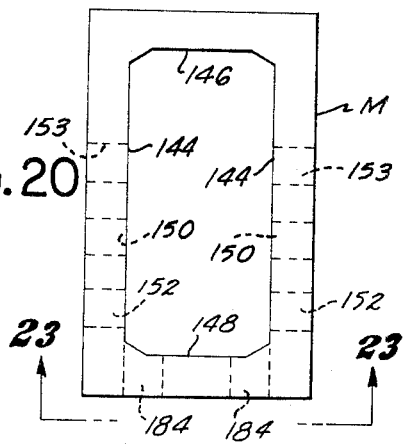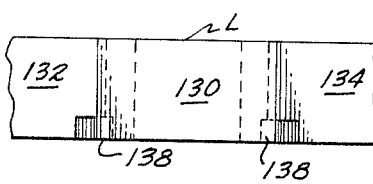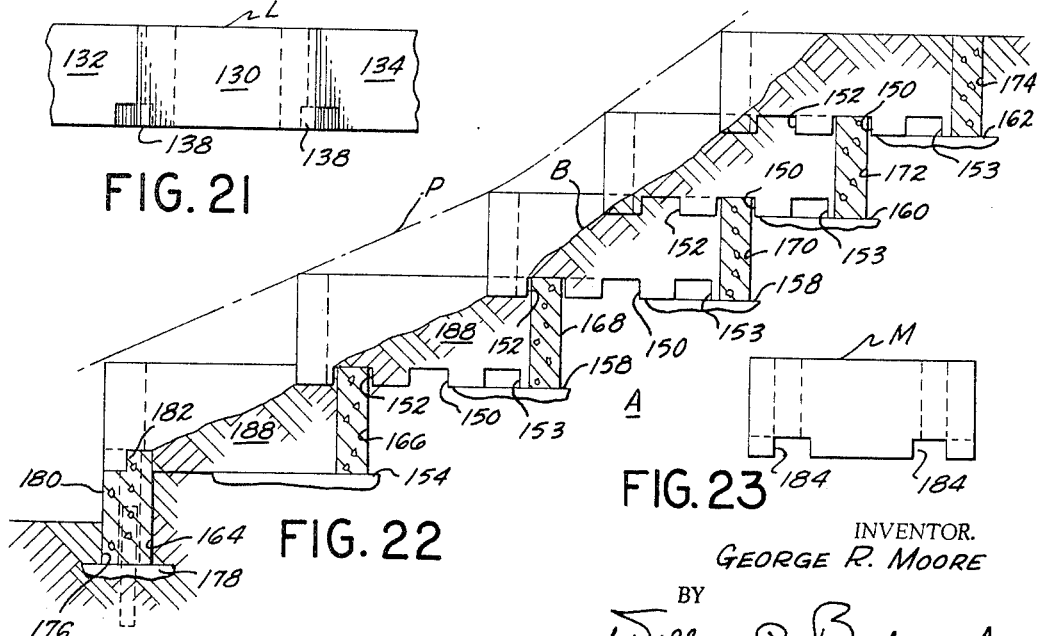

United States Patent Office 3,269,125
Patented August 30, 1966

3,269,125
HILLSIDE STABILIZING CONSTRUCTION
George R. Moore, Long Beach, Calif.
(3252 Falkland Circle, Huntington Beach, Calif.)
Filed Nov. 21, 1963, Ser. No. 325,285
6 Claims. (Cl. 61—35)

The present invention relates generally to the field of pre-cast blocks, and more particularly to precast blocks of such configuration that they may be assembled into an interconnected open structure adapted for use in stabilizing hillsides and embankments against erosion.

During the past few years the continued building of residences and other structures has greatly depleted the available level building sites in many desirable areas of this country, making it necessary to build new homes in hilly districts. One method of adapting hilly and steeply inclined terrain for residential construction has been to terrace it in order to provide sufficient level areas on which a home can be built, which inevitably creates steep embankments in the lot surrounding the building. In many instances such embankments are not only unsightly, but during storms and heavy rains they tend to become unstable, and to a degree that the residences adjacent thereto are endangered. However, the erection of conventional retaining walls to off-set this hazard very often is prohibitively expensive, whereby many prospective home owners refuse to buy property requiring the installation of a retaining wall.

A major object of the present invention is to provide lightweight pre-cast blocks of concrete or other dimensionally stable material that are so shaped that they can be easily handled and transported, and assembled without concrete or mortar in the field by one having little or no masonry experience into a structure which will stabilize and protect a hillside or embankment that may vary from 60° to 1 to 2 slope against erosion.

Another object of the invention is to provide pre-cast blocks, which when assembled, not only serve to stabilize a hillside or embankment, but beautify the same as well, and at a cost far less than that of a conventional retaining wall.

A still further object of the invention is to provide pre-cast blocks of such size as to permit mass production thereof by standard equipment therefor, may be easily palletized for shipment, and are sufficiently small that a minimum of damage occurs thereto during handling and after installation.

A further object of the invention is to furnish standard pre-cast blocks that may be assembled into a stabilizing structure on a hillside or embankments that vary widely in the degree of slope thereof without special manufacture, which blocks may be filled with soil after assembly to impart additional stability to the completed structure to prevent slippage of the earthen area it protects.

Another object of the invention is to provide pre-cast blocks of such design that they can be assembled in different patterns which are keyed to a hillside or embankment by galvanized steel rods or dowels, with the lower extremity of the assembled blocks terminating in a straight bottom stretcher for ease in cutting that portion of a lawn adjacent thereto.

Yet another object of the invention is to provide pre-cast blocks of such configuration as to be adapted for assembly into a protective structure for a hillside that requires less excavation and backfill for the installation thereof than hillside stabilizing structures available heretofore.

These and other objects and advantages of the present invention will become apparent from the following description of a first, and certain alternate forms thereof, and from the accompanying drawings illustrating the same, in which:

FIGURE 1 is a front elevational view of a portion of a hillside area that has been stabilized by use of the preferred form of the pre-cast blocks of the present invention;

FIGURE 2 is a top plan view of the assembled blocks shown in FIGURE 1, taken on the line 2—2 thereof;

FIGURE 3 is a transverse cross-sectional view of the assembled blocks on a hillside area, taken on the line 3—3 of FIGURE 1;

FIGURE 4 is a top plan view of a first form of header block;

FIGURE 5 is a fragmentary vertical cross-sectional view of a portion of the header block shown in FIGURE 4, taken on the line 5—5 thereof;

FIGURE 6 is a top plan view of a first form of stretcher block;

FIGURE 7 is a top plan view of a second form of stretcher block;

FIGURE 8 is a fragmentary horizontal, cross-sectional view of the abutting portions of two stretcher blocks showing the manner in which they interlock;

FIGURE 9 is a top plan view of a second form of header block installed in a hillside;

FIGURE 10 is another pattern in which the header blocks and stretcher blocks shown in FIGURE 9 may be installed in a hillside;

FIGURE 11 is yet another pattern in which the header and stretcher blocks shown in FIGURE 9 may be installed in a hillside;

FIGURE 12 is a top plan view of the second form of header block which is the type shown in FIGURES 9, 10 and 11;

FIGURE 13 is a top plan view of the third form of stretcher block of the type shown in FIGURES 9, 10 and 11;

FIGURE 14 is a vertical cross-sectional view of the installed blocks shown in FIGURE 9, taken on the line 14—14 thereof;

FIGURE 15 is a fragmentary transverse, cross-sectional view of one of the stretcher blocks shown in FIGURE 11, taken on the line 15—15 thereof;

FIGURE 16 is a fragmentary vertical, cross-sectional view of a portion of the header block shown in FIGURE 12, taken on the line 16—16 thereof;

FIGURE 17 is a top plan view of a number of third forms of header blocks assembled to protect a hillside area;

FIGURE 18 is a top plan view of one of the third forms of header block shown in FIGURE 17;

FIGURE 19 is a top plan view of a fourth form of header block shown installed in a hillside;

FIGURE 20 is a top plan view of one of the fourth forms of header blocks;

FIGURE 21 is a front elevational view of the third form of header block shown in FIGURE 18, taken on the line 21—21 thereof;

FIGURE 22 is a transverse cross-sectional view of the header blocks assembled as shown in FIGURE 19, taken on the line 22—22 thereof; and FIGURE 23 is a front elevational view of the fourth form of header block, taken on the line 23—23 of FIGURE 20.

With continuing reference to the drawings for the general arrangement of the preferred form of the invention, a transverse section of a hillside A that is to be stabilized is shown in FIGURE 3. The initial slope B of the hillside A is shown in phantom line in FIGURE 3. The hillside A is stabilized by forming a structure C of pre-cast blocks of concrete or other dimensionally stable material in excavations made therein in the pattern shown in FIGURES 1, 2 and 3. The structure C for maintaining the hillside A in a stable condition is provided by use of a first form of header block D shown in FIGURE 4, the first form of stretcher block E shown in FIGURE 6, and the second form of stretcher block F shown in FIGURE 7. The final slope P of structure C is shown in phantom line in FIGURE 3.

The first form of header block D is generally U-shaped, defined by a straight web 10, from the ends of which two identical legs 12 and 14 extend rearwardly and outwardly from one another in opposite directions. Block D is preferably made of cast concrete due to the inexpensive nature thereof and the fact that it is largely impervious to water and weathering.

Each block D, as can best be seen in FIGURE 5, has a recess 16 formed in the lower forward portion of web 10, and a tongue 18 extends downwardly in the forward central portion of this recess. The web 10, as well as the legs 12 and 14, are defined by a flat upper surface 20 and a lower surface 22 which is parallel thereto. The rear portion of legs 12 and 14 develop into a short flat side surface 12a and 14a respectively that extend in a direction normal relative to the forward surface 24 of web 10. Bores 12b and 14b extend downwardly through the rear portions of legs 12 and 14, as best shown in FIGURE 4.

The stretcher block E, as can best be seen in FIGURES 1, 3 and 6, is generally rectangular and partially defined by a flat upper surface 26, in the forward right-hand portion of which a recess 28 is formed. This first form of stretcher block E has a flat lower surface 30 that is parallel to the upper surface 26, and end surface 32 in which a vertically extending groove 34 is formed. Stretcher block E also includes an end 36 from which a tongue 38 projects outwardly that is adapted to engage groove 34 in a block E disposed adjacent thereto. A bore 40 extends downwardly through tongue 38, and the stretcher E also has a second bore 42 extending downwardly therethrough, as shown in FIGURE 6.

The second form of stretcher block F shown in FIGURE 7 is identical to the first form E thereof, other than that the recess 28 is omitted and a recess 28' is provided in lieu thereof which is located on the left-hand side of the block. Inasmuch as the two blocks E and F are of the same structure except for the location of the recesses 28 and 28' therein, the same identifying numerals are used in the drawings on components common to both blocks, but with primes being added to the numerals on the second block shown in FIGURE 7.

The blocks D, E and F (FIGURES 4, 6 and 7) are utilized in stabilizing a hillside A by first excavating to terrace the hillside into a number of vertically spaced plateaus 44, 46 and 48, as illustrated in FIGURE 3. The forward portion of plateau 44 is defined by a vertical surface 50, and the rear thereof terminates in a vertically extending face 52 that also serves to define the forward face of plateau 46. The rear of plateau 46 terminates in a vertically extending face 54 that serves to define the forward face of plateau 48, the rear of which in turn develops into an upwardly extending face 56 that intersects a level surface 58 of the hillside A.

After the cut 60 has been made, blocks E and F are laid therein in an end-to-end pattern as shown in FIGURE 2. When so disposed the tongue 38 or 38' of one block interlocks with the groove 34 or 34' of the block next adjacent thereto. Thereafter, rods or dowels 64 are driven down through the bores 40, 40' and 42, 42' of blocks E and F into the ground at the foot of the slope B to maintain the blocks in a fixed position relative thereto.

The stretcher blocks E and F are arranged in such a pattern in cut 60 that a number of header blocks D can be disposed in spaced relationship on plateau 44 to place the tongues 18 thereof in engagement with recesses 28 and 28' of the blocks (FIGURES 1 and 2). The header blocks D are spaced longitudinally on plateau 44 a distance substantially equal to the length of the forward face of one of the webs 10, plus the distance between faces 12a and 14a.

A course of stretcher blocks E and F are so laid end-to-end on the rear portion of the header blocks D resting on the plateau 44 that the bores 40, 42, 40' or 42' therein are in alignment with bores 12b or 14b. Dowels 64 are then driven downwardly through the aligned bores 40, 42, 40' or 42' and bores 12b or 14b into the slope B to anchor both the header blocks and stretcher blocks thereto. This method of laying blocks D, E and F is continued on plateaus 46 and 48 until the hillside retaining structure C is completed.

In forming a hillside retaining structure C such as shown in FIGURES 1, 2 and 3, in locations wherein the recesses 28 of the blocks E are not engaged, the blocks E are positioned upside down to place the recesses adjacent the surfaces 50, 52, 54 or 56 and are concealed from view. For the sake of clarity in the drawings, the blocks E (FIGURE 2) in such installations are identified by the notation E'. The areas G and O, also shown in FIGURE 2, may be filled with dirt H which may be planted with suitable flowers or ground cover (not shown).

The first alternate form of header block J is shown in FIGURE 12, which is rectangular and preferably formed from cast concrete. Block J includes two laterally spaced side walls 70, and two end walls 72 and 74. A recess 76 is formed in end wall 74 and extends across the under forward portion thereof. A tongue 79 projects downwardly into the forward portion of recess 76 from the end wall 74, as best illustrated in FIGURE 16. A pair of bores 77 are formed in the central portion of the side walls 70 of block J, and additional pairs of bores 78, 80 and 81 which are in longitudinal spaced relationship, are formed in the rear portion of the block, as shown in FIGURE 12.

The third form of stretcher block K is shown in FIGURE 13, which is generally rectangular and has a straight forward wall 82 and a rear wall 84. Each block K has a flat upper surface 86 in which a centrally disposed rectangular recess 88 is formed in the forward central portion thereof. Two pairs of bores 90 and 92 extend through each block K and are located on opposite sides of recess 88 (FIGURE 13). The block K has a vertically extending end surface 94 in which a groove 96 is formed, as well as an end surface 97 from which a vertically extending tongue 98 projects outwardly. A bore 100 extends through tongue 98.

When it is desired to stabilize a hillside A, it is excavated to provide a number of flat plateaus 102, 104, and 106 therein that are arranged in staircase configuration. The forward portion of the plateau 102 terminates in a flat forward face 108. The rear of plateau 102 develops into an upwardly extending surface 110 which also defines the forward portion of plateau 104. At the rear thereof plateau 104 terminates in a flat, vertically extending face 112 that also defines the forward portion of plateau 106. The rear end of plateau 106 terminates in a flat, upwardly extending surface 114 which terminates in a flat surface area 116 that defines the top of the slope B.

A course of the stretcher blocks K are disposed end-to-end and in abutment with the surface 108, as best illustrated in FIGURE 14, with the blocks resting on a sand foundation or other suitable support at the bottom of the hillside A. The tongue 98 of one of the blocks K adjacent to the surface 108 interlocks with the groove 96 of the block K positioned next to it. A number of dowels or rods 120 are driven downwardly through the bores 90, 92 and 100 into the ground near the lower extremity of the hillside A and serve to anchor the lower course of stretcher blocks K in a fixed position relative to the hillside.

Header blocks J are then laid on the plateau 102, and may be arranged in various patterns thereon as shown in FIGURES 9, 10 and 11. Next, the course of stretcher blocks K are laid across the rear portion of the header blocks J resting on plateau 102 (FIGURE 14). Dowels 120 are thereafter extended downwardly through the bores 90 and 92 to pass through one of the pairs of bores 78, 80 or 81 in one of the header blocks J and then into the ground of the hillside A to anchor the second course of stretcher blocks K adjacent the surface 110 and the header blocks J resting on plateau 102 to the hillside.

This process is continued, and additional header blocks J are placed on plateaus 104 and 106 with stretcher blocks J resting on the rear thereof in abutting contact with the upper portions of surfaces 112 and 114. To avoid driving the dowels 120 too far into the ground of the hillside A to adequately vertically support the course of stretcher blocks K', a ring-shaped stop 122, shown in FIGURE 15, may be affixed at an intermediate position on the dowels. Stop 122 engages the lower surface of the adjacent stretcher block K whereby a portion 120a of the dowel projects upwardly to engage bore 100 in one of the stretcher blocks K or block K'.

The header blocks J are susceptible of arrangement in a variety of patterns on the stretcher blocks K, as illustrated in FIGURES 9, 10 and 11. The particular pattern in which the header blocks J are arranged will be dictated in large part by the ornamental design desired in the stabilization of a hillside A by use of the header blocks and stretcher blocks of the present invention.

The purpose of the sequence of bores 77, 78, 80 and 81 in the first alternate form of header block J is to permit the courses of blocks K (FIGURE 14) to be moved forwardly or backwardly relative to the header block to interlock therewith to meet various slope B requirements. The pattern of blocks seen in FIGURE 14 is adapted for positioning in slopes that vary between 30° and 60° relative to the horizontal as shown in slope (phantom line) P in FIGURE 14.

A second alternate form of header block L is shown in FIGURE 18 that is generally U-shaped and includes a web 130 having legs 132 and 134 extending rearwardly and outwardly in opposite directions from the ends thereof. The legs 132 and 134 have short, rearwardly disposed faces 132a and 134a that extend in a direction normal to the forward face 136 of web 130. Two angularly disposed grooves 138 are formed in header block L at the junction between the ends of web 130 and legs 132 and 134, and the grooves angle rearwardly and inwardly towards one another in the under portion of the block.

Header blocks L are used in much the same manner as the blocks previously described to stabilize a hillside area A, with the header blocks L rising sequentially in steps after the hillside has been terraced. As can best be seen in FIGURE 17, the header blocks L are disposed in a pattern where the rear extremities of the legs 132 and 134 of each block removably interlock with the grooves 138 in header blocks L in the next course immediately thereabove. If the slope B is not too great, the header blocks L may be placed in interlocking relationship as shown in FIGURE 17, without the use of dowels.

However, if it is desired to use dowels 120, pairs of downwardly extending bores 140 may be formed in blocks L above the grooves 138 nd bores 142 in the rear portion of the legs 132 and 134, as shown in FIGURE 18. The bores 140 of one block L will be vertically aligned with the bore 142 in two blocks L situated immediately below the web 130 (FIGURE 18). Dowels 120 may also be driven through the bores 140 to extend through bores formed in a course of stretcher blocks, such blocks E and F shown in FIGURES 6 and 7 respectively. The second alternate form of header block L is, like the blocks previously described, preferably formed from cast concrete due to the durability and the low production cost thereof.

A third alternate form of header block M is shown in FIGURE 20 that has two laterally spaced side walls 144, an end wall 146, and a forward end wall 148. Longitudinally spaced, transversely aligned pairs of grooves 150, 152 and 153 are formed in the lower portion of the side walls 144. Header block M is used in stabilizing a hillside A by terracing the same to provide a number of plateaus 154, 156, 158, 160 and 162, which are further defined by straight vertical faces 164, 166, 168, 170, 172 and 174 respectively.

As shown in FIGURE 22, the hillside A forwardly of the vertical face 164, has a cut 176 made therein in which sand or other suitable material 178 is tamped to provide a base for a course of rectangular stretcher blocks 180 that interlock due to a tongue and groove engagement on the ends thereof. Tongues 182 extend upwardly from blocks 180 that engage two grooves 184 formed in the forward end wall 148 of header block M. The stretcher blocks 180 also are provided with downwardly extending bores 186 through which dowels 120 can be driven into the ground forwardly of the hillside A as shown in FIGURE 22.

The blocks M are then positioned in spaced relationship on the plateaus 154, 156, 158, 160 and 162 in such a manner (FIGURE 19) that the grooves 150, 152 or 153 of the blocks in one course engage rearwardly disposed portions of the side walls 144 of blocks M in the course immediately therebelow. Blocks M, as mentioned herein, may be used on hillsides A of varying angulation. In FIGURE 22 the lower portion of the hill is shown as having a lesser angle than the upper portion thereof, and therefore in the lower courses of blocks M the grooves 152 engage end wall 146 of the block therebelow. As the slope B of the hillside A increases towards the top thereof, the grooves 150 are caused to engage the end wall 146. The grooves 184 in each block M (FIGURE 19) engage side walls 144 of the blocks immediately therebelow, and thus determine the spacing between the blocks. After assembly thereof in this manner on a hillside A, the blocks M are partially filled with dirt 188 to hold them in fixed position thereon. If desired, from the standpoint of increasing the stability of the blocks after installation on a hillside A, the blocks may be formed with vertically alignable bores (not shown) therein which can be engaged by dowels, likewise not shown, that are driven therethrough into the hillside. As shown in FIGURES 3, 12 and 22, the slope P of the finished pre-cast block structure may be substantially different from that of the initial slope B of the hillside A.

The use and operation of the preferred and various alternate forms of the invention have been previously described in detail and need not be repeated.

Although the present invention is fully capable of achieving the objects and providing the advantages hereinbefore mentioned, it is to b understood that it is merely illustrative of the presently preferred embodiments thereof and I do not mean to be limited to the details of construction herein shown and described, other than as defined in the appended claims.

I claim:
1. A block assembly for stabilizing hillside areas, comprising:
   (a) a plurality of first U-shaped dimensionally stable header blocks, each of which includes a forwardly disposed web and two legs that extend rearwardly and outwardly in opposite directions from the ends thereof, said web having a forwardly disposed recess formed in the forward under portion thereof and a tongue that projects downwardly in said recess, with each of said legs having a first bore formed therein that extends downwardly through a rear portion thereof, which header blocks are disposed in rows on said hillside areas wherein they are horizontally spaced from one another first distances, vertically spaced from one another second distances, with said webs of said blocks in one row being in vertical align- ment with rear portions of said legs of said blocks in said row therebelow;

(b) a plurality of rectangular dimensionally stable stretcher blocks of the same height as said second distance that are arranged in rows adjacent said header blocks, each of said stretcher blocks having a groove formed therein that is engaged by one of said tongues, with each of said stretcher blocks having a second vertical bore formed therein that is in vertical alignment with one of said first bores, which stretcher blocks rest on the upper surfaces of said webs, and when so disposed the ends of said stretcher blocks in said rows are in abutting contact;

(c) means on the ends of said stretcher blocks for interlocking one to another when said blocks are arranged in said rows; and (d) a plurality of dowels that extend through said first and second bores into said hillside to hold said assembly thereon as an integral structure.

2. A block assembly as defined in claim 1 wherein each of said means comprises a longitudinally projecting, vertically disposed rib on one of said blocks that removably engages a vertically positioned recess formed in the end portion of said stretcher block most adjacent thereo.

3. A block assembly as defined in claim 1 wherein said legs of said header blocks and the length of said stretcher blocks are such that a plurality of hexagonal areas are defined by said blocks when installed in said hillside.

4. An interlocking block assembly for stabilizing a sloping ground surface, comprising:

(a) a U-shaped dimensionally stable header block that includes a forwardly disposed straight web and two straight legs which extend rearwardly and outwardly in opposite directions from the ends thereof, said web having a recess formed in the forward under portion thereof and a tongue that projects downwardly in said recess from said web, with each of said legs having a first bore formed therein that extends downwardly through a rear portion thereof;

(b) a plurality of rectangular dimensionally stable stretcher blocks that are arranged in rows in end-to-end relationship, each of which has a recess formed in the upper forward portion thereof that can be engaged by said tongues to interlock the forward portion of said header block to one of said stretcher blocks in which said tongue is disposed, with each of said stretcher blocks having a plurality of second bores extending downwardly therethrough that may be aligned with said bores in said legs when the rear portions of said header block are resting on at least one of said stretcher blocks; and (c) a plurality of dowels that extend downwardly through said first and second bores in said header block and stretcher blocks into said ground to hold said header block and stretcher blocks in fixed positions relative thereto.

5. A block assembly as defined in claim 4 wherein each of said stretcher blocks has a vertical groove formed on one end thereof and a tongue projects from the opposite end of said block, which tongues and grooves interlock when said stretcher blocks are disposed in end-to-end relationship.

6. An interlocking block assembly as defined in claim 5 wherein each of said tongues on said stretcher blocks has a second bore extending downwardly therethrough that is engaged by one of said dowels.

References Cited by the Examiner

UNITED STATES PATENTS

| 1,174,819 | 3/1916 | Buente | 61—48 |
| 1,365,162 | 1/1921 | Ferguson | 52—591 |
| 2,474,786 | 6/1949 | Humphrey | 61—47 X |
| 2,828,613 | 4/1958 | Wilson | 61—47 |
| 2,911,794 | 11/1959 | Phearson | 61—35 |
| 2,960,797 | 11/1960 | Frehner | 61—35 X |

CHARLES E. O'CONNEL, *Primary Examiner.*

JACOB SHAPIRO, *Examiner.*